(12) United States Patent
Deshpande

(10) Patent No.: US 8,138,961 B2
(45) Date of Patent: Mar. 20, 2012

(54) STEP FREQUENCY ISAR

(75) Inventor: Manohar D. Deshpande, Odenton, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 261 days.

(21) Appl. No.: 12/561,644

(22) Filed: Sep. 17, 2009

(65) Prior Publication Data

US 2010/0245163 A1 Sep. 30, 2010

Related U.S. Application Data

(60) Provisional application No. 61/162,822, filed on Mar. 24, 2009.

(51) Int. Cl.
*G01S 13/90* (2006.01)
*G01S 7/28* (2006.01)
*G01S 13/00* (2006.01)
*G01S 7/00* (2006.01)

(52) U.S. Cl. ..... 342/25 F; 342/22; 342/25 R; 342/25 A; 342/26 R; 342/26 A; 342/26 B; 342/118; 342/128; 342/130; 342/131; 342/134; 342/137; 342/175; 342/176; 342/179; 342/195; 342/196; 702/1; 702/2; 702/3; 702/14; 702/16

(58) Field of Classification Search ............ 342/22, 342/25 R–26 D, 27, 28, 118, 175, 176, 179, 342/195, 196, 128–133, 134–145, 192–194, 342/197; 702/1, 2, 3, 14, 16
See application file for complete search history.

(56) References Cited

U.S. PATENT DOCUMENTS

| | | | | | |
|---|---|---|---|---|---|
| 3,443,230 | A | * | 5/1969 | Pratt | 342/26 R |
| 3,881,154 | A | * | 4/1975 | Lewis et al. | 342/26 R |
| 4,011,565 | A | * | 3/1977 | Toman | 342/26 D |
| 4,356,487 | A | * | 10/1982 | Herbreteau | 342/26 D |
| 4,450,444 | A | * | 5/1984 | Wehner et al. | 342/25 F |
| 4,463,357 | A | * | 7/1984 | MacDoran | 342/26 A |
| 5,428,358 | A | * | 6/1995 | Gardner | 342/26 D |
| 5,905,456 | A | * | 5/1999 | Didier | 342/25 C |
| 6,023,235 | A | * | 2/2000 | Sauer | 342/25 F |
| 6,831,592 | B2 | * | 12/2004 | Perry | 342/195 |
| 6,914,553 | B1 | * | 7/2005 | Beadle et al. | 342/25 R |
| 6,919,839 | B1 | * | 7/2005 | Beadle et al. | 342/25 R |
| 2007/0285302 | A1 | * | 12/2007 | Aarseth et al. | 342/25 R |

* cited by examiner

*Primary Examiner* — Bernarr Gregory

(57) ABSTRACT

A step frequency inverse synthetic aperture radar (ISAR) includes a transmitter configured to transmit a transmission pulse at a transmission frequency to a near earth object (NEO), the transmission frequency having a frequency range comprising a starting frequency, an ending frequency, and a step size; a receiver configured to receive a pulse response from the NEO, the pulse response corresponding to the transmission pulse; and a computer configured to determine a 3-dimensional image of the interior of the NEO from the pulse response.

20 Claims, 4 Drawing Sheets

STEP FREQUENCY ISAR

This application claims the benefit of U.S. Provisional Application No. 61/162,822 (Deshpande), filed on Mar. 24, 2009.

This application was made by employees of the United States Government and may be manufactured and used by or for the Government of the United States for government purposes without the payment of royalties thereon or therefor.

BACKGROUND

This disclosure relates generally to the field of radar systems and specifically to inverse synthetic aperture radar (ISAR) systems.

There is a relative scarcity of information available regarding the internal structures of many bodies in the solar system, including near earth objects (NEOs) such as cometary nuclei and asteroids. Ground-based microwave radar may characterize NEOs as single homogenous objects, as ground-based microwave radar may have an imaging resolution of over 15 meters. Because earth-crossing objects such as Apophis are scheduled to pass inside the moon's orbit in 2029, and may constitute a potential hypervelocity impact risk to Earth, availability of detailed information regarding the internal structure of NEOs may allow scientists to quantify the mechanics of impact events involving NEOs.

BRIEF SUMMARY

An exemplary embodiment of a step frequency ISAR includes a transmitter configured to transmit a transmission pulse at a transmission frequency to a NEO, the transmission frequency having a frequency range comprising a starting frequency, an ending frequency, and a step size; a receiver configured to receive a pulse response from the NEO, the pulse response corresponding to the transmission pulse; and a computer configured to determine a 3-dimensional image of the interior of the NEO from the pulse response.

An exemplary embodiment of a method of operating a step frequency ISAR includes transmitting a transmission pulse at a transmission frequency to a NEO, the transmission frequency having a frequency range comprising a starting frequency, an ending frequency, and a step size; receiving a pulse response from the NEO, the pulse response corresponding to the transmission pulse; and determining a 3-dimensional image of the interior of the NEO from the pulse response.

An exemplary embodiment of an ionospheric sounder comprising a step frequency ISAR includes a transmitter configured to transmit a transmission pulse at a transmission frequency to the earth's ionosphere, the transmission frequency having a frequency range comprising a starting frequency, an ending frequency, and a step size; a receiver configured to receive a pulse response from the earth's ionosphere, the pulse response corresponding to the transmission pulse; and a computer configured to determine a 3-dimensional image of an electron density of the earth's ionosphere from the pulse response.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for a step frequency ISAR are provided, with exemplary embodiments being discussed below in detail. Embodiments of a step frequency ISAR may produce detailed 3-dimensional (3D) images of the interior structure of objects in space, such as NEOs. Additionally, a step frequency ISAR may be used to characterize the internal structure of the lunar regolith at sites being considered for future human outposts. Embodiments of a step frequency ISAR may also be used an ionospheric sounder for making measurements of the electron density of the Earth's ionosphere, which may extend up to 200 km up from the Earths' surface. Such measurements may be used to characterize radio signal propagation for communications or surveillance operations.

A step frequency ISAR performs low-frequency wideband subsurface imaging of a target with high resolution. The step frequency ISAR apparatus may have relatively low mass, power consumption, and data-rate, and be frequency and polarization agile, making it appropriate for use in rendezvous exploration of targets from unmanned aerial vehicles (UAVs) or other low altitude vantage points. Various other functions may also be performed by the step frequency ISAR, including but not limited to functioning as an altimeter, a surface topographer, or subsurface geology imager.

Figure 1:
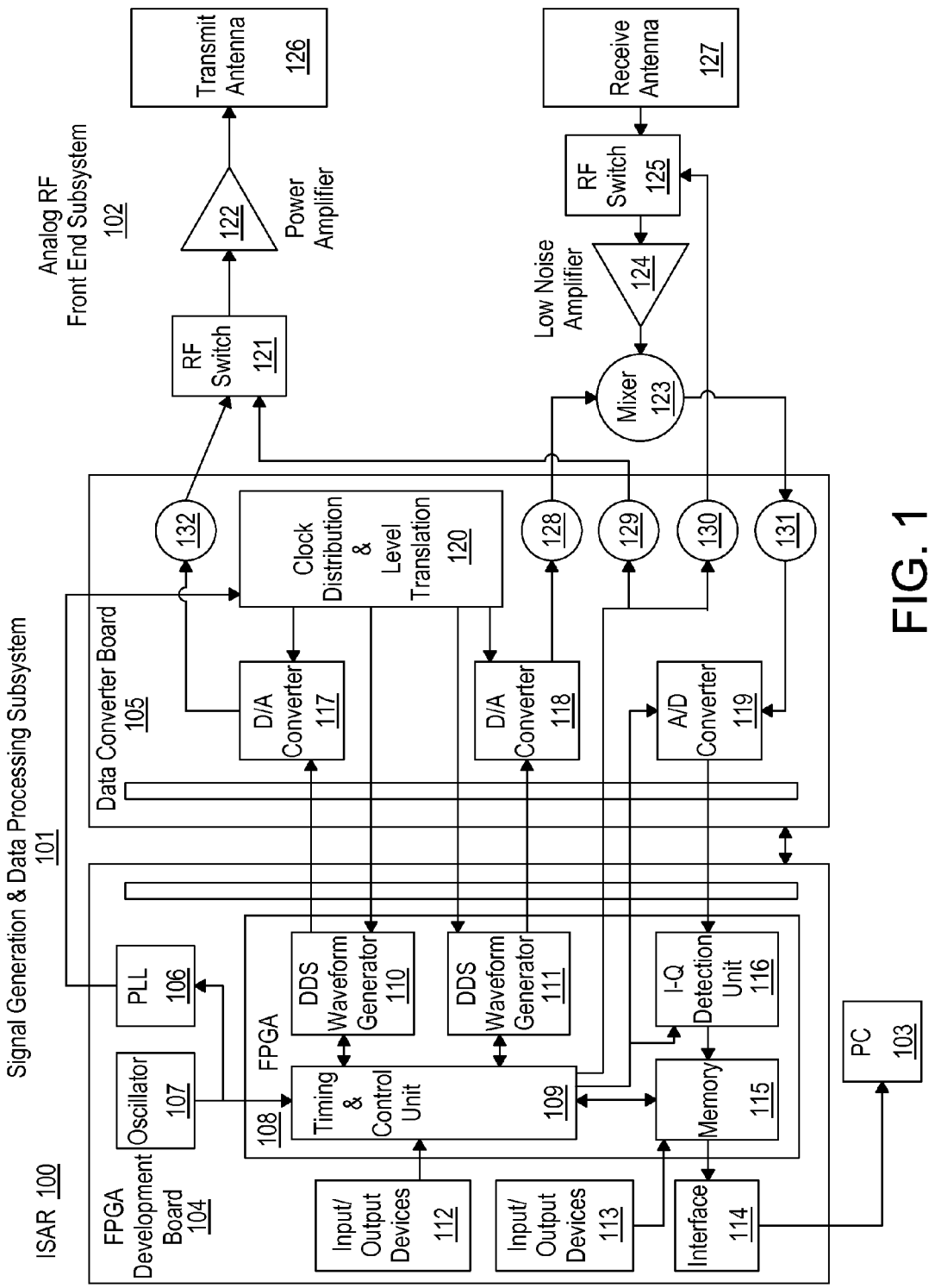
FIG. 1 illustrates an embodiment of a step frequency ISAR.

FIG. 1 illustrates an embodiment of a step frequency ISAR 100. The step frequency ISAR 100 comprises two subsystems: the base band signal generation and data processing subsystem 101, and an analog RF front end subsystem 102. Data acquisition, post processing and image retrieval/display are performed on attached dedicated personal computer (PC) 103. Step frequency ISAR 100 may be powered by a multivoltage power supply (not shown), which in some embodiments may comprise a 3.3 volt or a 5 volt power supply. Antennae 126 and 127 comprise wideband antennae; in some embodiments antennae 126 and 127 cover a 75 MHz bandwidth with a broad beam pattern. Signal generation and data processing subsystem 101 comprises an FPGA development board 104 and a data converter board 105. FPGA development board 104 comprises an FPGA 108, which in turn comprises timing and control unit 109, and two direct digital synthesis (DDS) waveform generators 110 and 111.

Oscillator 107 provides a signal to a phase locked loop (PLL) 106 and timing and control unit 109. PLL 106 supplies a signal to clock distribution and level translation unit 120; clock distribution and level translation unit 120 controls two digital/analog (D/A) converters 117 and 118. D/A converters 117 and 118 receive signals from DDS units 110 and 111, respectively. D/A converter 117 sends a transmission signal having a transmission frequency to RF switch 121 via port 132. RF switch 121 is controlled by a pulse modulation signal from port 129 to generate a transmission pulse. The transmission pulse may have a duration of about 0.5 microseconds (μs) in some embodiments. The transmission pulse is sent from RF switch 121 to power amplifier 122, which increases the power of the transmission pulse before the transmission pulse is transmitted on transmission antenna 126. The transmission pulse illuminates the target, and is reflected from the target back to the ISAR 100 as a pulse response.

The pulse response is received on receive antenna 127, and sent via RF switch 125 and low noise amplifier 124 to mixer 123. RF switch 125 is controlled by a pulse modulation signal from port 130. Since the pulse response is expected to be received on antenna 127 in a time window spanning from 3 to 8 µs after each transmission pulse, pulse modulation signal 130 opens RF switch 125 during that time window; this protects the low-noise amplifier 124 by preventing strong signals from entering into the receive electronics while the transmission pulse is being transmitted from antenna 126. Mixer 123 performs intermediate frequency (IF) down conversion on the amplified pulse response using a reference signal received from D/A converter 118 via reference signal port 128; the reference signal has a frequency that is slightly lower than the transmission frequency but is otherwise identical to the transmission signal. The pulse response is down converted to a 5 MHz IF signal in some embodiments. The down converted signal is sent to A/D converter 119 via port 131. A/D converter 119 digitizes the down converted signal, and then sends the digitized signal to I-Q detection unit 116, which extracts in-phase (I) and quadrature (Q) data from the digitized signal. The extracted I-Q data is sent to PC 103 via memory 115 and interface 114. Interface 114 may comprise a RS232 interface in some embodiments. Processing and display of the extracted I-Q data is performed on PC 103.

The transmission pulse transmitted by the step frequency ISAR covers a frequency range having a starting value and an ending value; the frequency of the transmission pulse is incremented by a predetermined step size every pulse repetition interval (PRI) until the ending value of the transmission frequency range is reached, at which point the step frequency ISAR returns to the starting value frequency. In some embodiments, the step size may be in a range from about 1 MHz to about 3 MHz, and the PRI may be about 10 µs. For an NEO rendezvous application, the transmission frequency may have a starting value of 25 MHz and an ending value of 100 MHz. For an ionospheric sounding application, the transmission frequency range may start at 3 MHz and end at 20 MHz. Because the frequency range is covered in steps, the instantaneous bandwidth required for processing is significantly lower than would be required for the overall bandwidth. In some embodiments, the transmission power may be between about 20 to 50 Watts, the range may be about 150 meters, and the depth penetration into a target may be about 10 to 20 meters, with a resolution of about 2 m or less. Use of low frequencies increases depth penetration, and wide bandwidth increases the image resolution.

Figure 2:
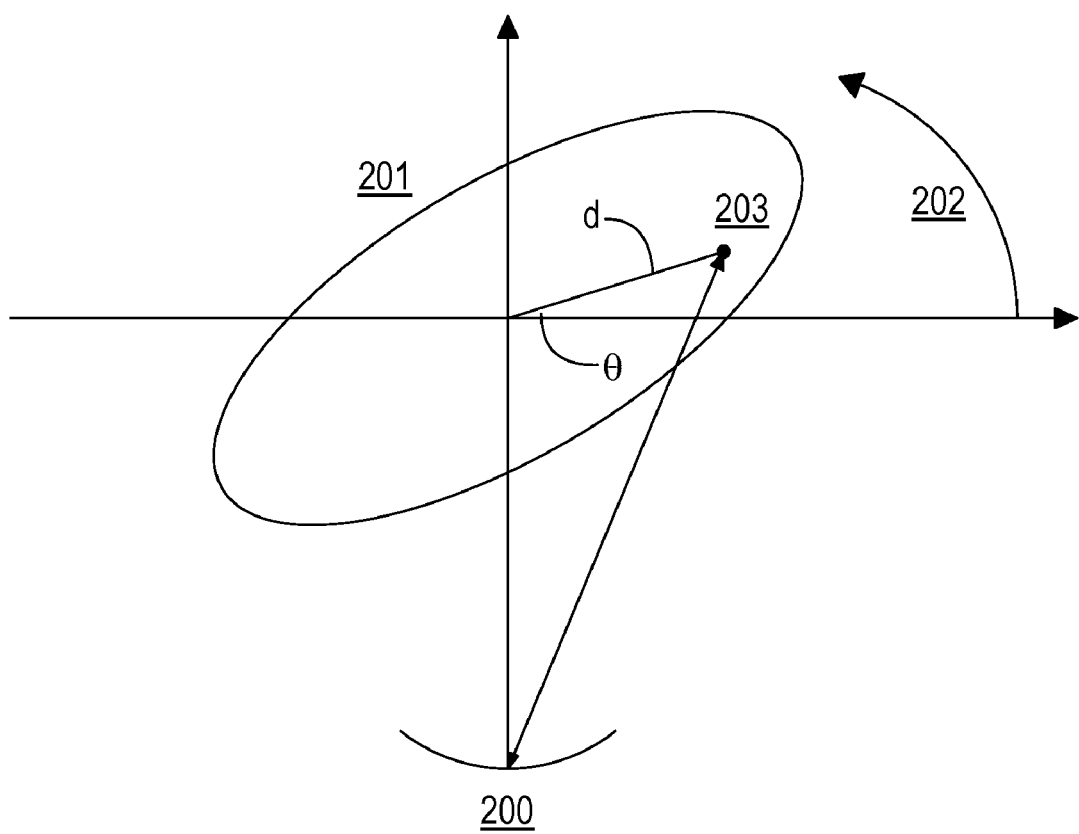
FIG. 2 illustrates an embodiment of a step frequency ISAR shown in relation to a target in space.

FIG. 2 illustrates an embodiment of a step frequency ISAR 200 shown in relation to a target 201. Step frequency ISAR 200 may comprise a lightweight, low frequency wideband ISAR that illuminates target 201 while going around target 201. In some embodiments, step frequency ISAR 200 may be mounted on a UAV, and target 201 may comprise a NEO. As target 201 translates and rotates within the beam transmitted by ISAR 200, an inverse synthetic aperture is formed by the coherent construction of the return signals, creating the equivalent of a large circular aperture focused at the center-of-rotation of target 201. The target 201 may rotate very slowly, therefore, it may be assumed for the purposes of any given radar look angle that the target 201 is stationary.

For each look angle the ISAR 200 illuminates the target 201 with a step frequency pulse, and determines I-Q data from the return pulse. The interior of target 201 may be assumed to comprise a plurality of point targets such as point target 203.

When the target is illuminated by a pulse, the return pulse from point target 203 may be written as:

$$G(f,\theta_0) = e^{j2\pi 2(d/C)Cos(\theta_0)f} \quad (1),$$

Where d is the radial distance of the point target from the local X-Y coordinate system and $\theta_0$ is the rotational position of the point target at the time of observation. The return pulse $G(f, \theta_0)$ from the point target 203 is observed from a frequency band ranging from $f_1$ to $f_2$ with frequency steps $\Delta f$. For a look angle $\theta_i = \theta_0 + i\Delta\theta$, the return pulse from the point target 203 may be approximated by $$G(f,\theta_i) = e^{j2\pi 2(d/C)Cos(\theta_0)f} e^{-j2\pi 2(d/C)Sin(\theta_0)i\Delta\theta f} \quad (2).$$

for a small angle approximation. With $f_o = (f_1+f_2)/2$, and $f = f_0 + f'$, (2) may be written as $$G(f,\theta_i) = e^{j2\pi f_0(2y/C - 2xi\Delta\theta/C)} e^{j2\pi 2yf'/C} e^{-j2\pi 2xi\Delta f_0/C} \quad (3).$$

The return pulse given in (3) is collected over frequency band $f_1-f_0 = -N\Delta f$ to $f_2-f_0 = N\Delta f$, and hence may be inverse Fourier transformed into the time domain:

$$G(f,\theta_i) = e^{j2\pi f_0(2y/C - 2xi\Delta\theta/C)} Sin(2\pi(2(y-y')N\Delta f/C))/2(y-y')N\Delta f/C e^{-j2\pi 2xi\Delta f_0/C} \quad (4).$$

If the look angles over which the observation are made range from $i=-M$ to $i=M$, forward Fourier transform may be taken with respect to 0, resulting in an image of point target 203 given by:

$$G(f,\theta_i) = e^{j2\pi f_0(2y/C - 2xi\Delta\theta/C)} * Sin(2\pi(2(y-y')N\Delta f/C))/2$$
$$(y-y')N\Delta f/C * Sin(2\pi f_0 M\Delta\theta(2(x-x')N\Delta f/C))/$$
$$2\pi f_0 M\Delta\theta(2(x-x')N\Delta f/C \quad (5).$$

Figure 3:
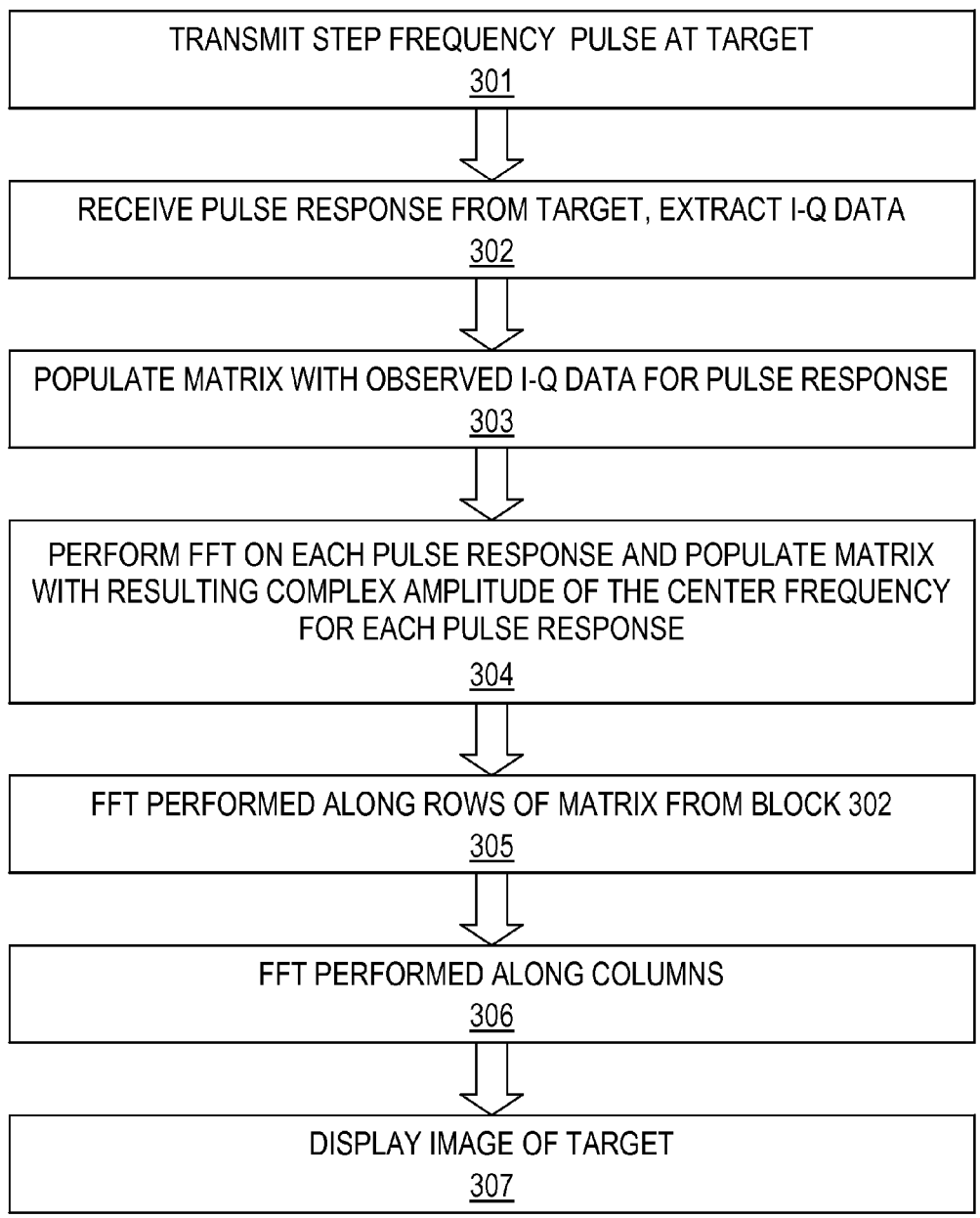
FIG. 3 illustrates an embodiment of a method of operating a step frequency ISAR.

FIG. 3 illustrates a method 300 of operating a step frequency ISAR. In block 301, a transmission pulse having a starting frequency, an ending frequency, and a step size is transmitted at the target from the ISAR. The frequency of the transmission pulse is incremented by the step size every PRI. In various embodiments, the target may comprise an NEO, the moon, or the earth's ionosphere. In block 302, a pulse response corresponding to the transmitted pulse is received by the ISAR from the target, and I-Q data is extracted from the pulse response. In block 303, the observed I-Q data from each pulse response is used to populate a series of matrixes [$I^p_{nm}$, $Q^p_{nm}$] for values of p from 1 to P, and values of n from 1 to N, where p is the look angle, n is the pulse number, and m is the range bin:

$$[I^1_{1m}, Q^1_{1m}][I^1_{2m}, Q^1_{2m}] \ldots [I^1_{Nm}, Q^1_{Nm}]$$
$$[I^2_{1m}, Q^2_{1m}][I^2_{2m}, Q^2_{2m}] \ldots [I^2_{Nm}, Q^2_{Nm}]$$
$$\ldots$$
$$[I^P_{1m}, Q^P_{1m}][I^P_{2m}, Q^P_{2m}] \ldots [I^P_{Nm}, Q^P_{Nm}]$$

In block 304, fast Fourier transform (FFT) is performed on each pulse response, and a matrix is populated with the resulting complex amplitude of the center frequency for each pulse response:

$$[G^1_1 G^1_2 \ldots G^1_N]$$
$$[G^2_1 G^2_2 \ldots G^2_N]$$
$$\ldots$$
$$[G^P_1 G^P_2 \ldots G^P_N]$$

In block 305, FFT is performed along the rows of the above matrix to obtain the down range:

$$[g^1(y_1) g^1(y_2) \ldots g^1(y_N)]$$
$$[g^2(y_1) g^2(y_2) \ldots g^2(y_N)]$$
$$\ldots$$
$$[g^P(y_1) g^P(y_2) \ldots g^P(y_N)]$$

In block 306, FFT is performed along the columns to obtain the cross range:

$$[f(x_1, y_1) f(x_1, y_2) \ldots f(x_1, y_N)]$$
$$[f(x_2, y_1) f(x_2, y_2) \ldots f(x_2, y_N)]$$
$$\ldots$$
$$[f(x_P, y_1) f(x_P, y_2) \ldots f(x_P, y_N)]$$

The resulting 3D image of the target, f(x,y), may be displayed in block 307.

Table 1 shows technical specifications for an exemplary embodiment of a step frequency ISAR for rendevous imaging of an NEO target.

TABLE 1

| | |
|---|---|
| Frequency Range: | 25 to 100 MHz |
| Frequency Step: | between 1 to 3 MHz |
| Bandwidth: | 75 MHz |
| Range Resolution: | 2.0 m in free space, finer resolution possible in dielectric media |
| Transmit Power: | 20-50 Watts |
| Bits for I and Q: | 14 bits |
| PRI: | 10 µs |
| Pulse Width: | between 0.5 and 1.0 µs |
| Data acquisition time (for full range of frequencies) | 0.26 milliseconds (ms) |

Figure 4:
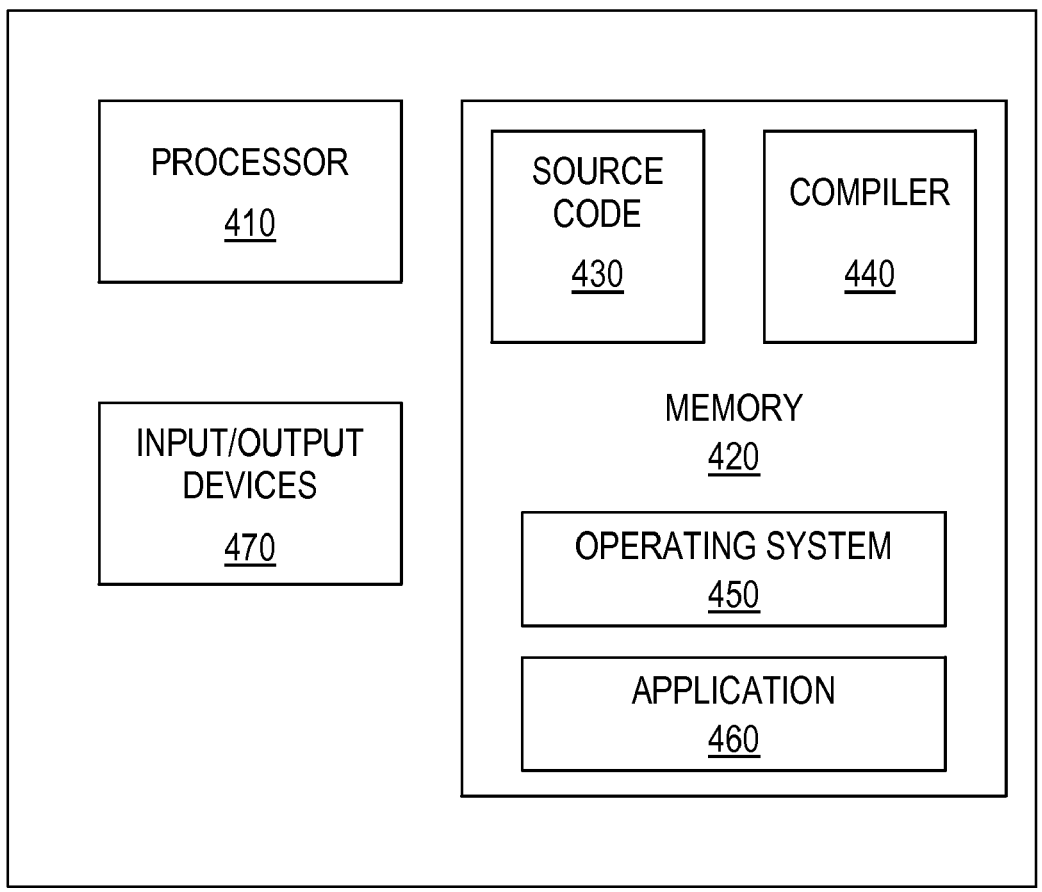
FIG. 4 illustrates an embodiment of a computer that may be used in conjunction with a step frequency ISAR.

FIG. 4 illustrates an example of a computer 400 having capabilities, which may be utilized by exemplary embodiments of a step frequency ISAR. Various operations discussed above may utilize the capabilities of the computer 400. One or more of the capabilities of the computer 400 may be incorporated in any element, module, application, and/or component discussed herein.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a data signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a non exhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include high-resolution 3D imaging of the internal structure of a target.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A step frequency inverse synthetic aperture radar (ISAR) comprising:
    a transmitter configured to transmit a transmission pulse at a transmission frequency to a near earth object (NEO), the transmission frequency having a frequency range comprising a starting frequency, an ending frequency, and a step size;
    a receiver configured to receive a pulse response from the NEO, the pulse response corresponding to the transmission pulse; and
    a computer configured to determine a 3-dimensional image of the interior of the NEO from the pulse response.

2. The step frequency ISAR of claim 1, wherein the step frequency ISAR is mounted on an unmanned aerial vehicle (UAV).

3. The step frequency ISAR of claim 1, wherein the frequency range is about 75 MHz.

4. The step frequency ISAR of claim 3, wherein the starting frequency is about 25 MHz, and the ending frequency is about 100 MHz.

5. The step frequency ISAR of claim 1, wherein a transmit power of the transmitter is between about 20 watts and about 50 watts.

6. The step frequency ISAR of claim 1, wherein the step size is in a range between about 1 MHz and about 3 MHz.

7. The step frequency ISAR of claim 1, wherein the transmission frequency varies from the starting frequency to the ending frequency, and is incremented by the step size every pulse repetition interval (PRI).

8. The step frequency ISAR of claim 7, wherein the PRI is about 10 microseconds.

9. A method of operating a step frequency inverse synthetic aperture radar (ISAR), the method comprising:
    transmitting a transmission pulse at a transmission frequency to a near earth object (NEO), the transmission frequency having a frequency range comprising a starting frequency, an ending frequency, and a step size;
    receiving a pulse response from the NEO, the pulse response corresponding to the transmission pulse; and
    determining a 3-dimensional image of the interior of the NEO from the pulse response.

10. The method of claim 9, wherein the step frequency ISAR is mounted on an unmanned aerial vehicle (UAV).

11. The method of claim 9, wherein the frequency range is about 75 MHz.

12. The method of claim 11, wherein the starting frequency is about 25 MHz, and the ending frequency is about 100 MHz.

13. The method of claim 9, wherein a transmit power of the transmitter is between about 20 watts and about 50 watts.

14. The method of claim 9, wherein the step size is in a range between about 1 MHz and about 3 MHz.

15. The method of claim 9, wherein the transmission frequency varies from the starting frequency to the ending frequency, and is incremented by the step size every pulse repetition interval (PRI).

16. The method of claim 15, wherein the PRI is about 10 microseconds.

17. An ionospheric sounder comprising a step frequency inverse synthetic aperture radar (ISAR), the step frequency ISAR comprising:
 a transmitter configured to transmit a transmission pulse at a transmission frequency to the earth's ionosphere, the transmission frequency having a frequency range comprising a starting frequency, an ending frequency, and a step size;
 a receiver configured to receive a pulse response from the earth's ionosphere, the pulse response corresponding to the transmission pulse; and
 a computer configured to determine a 3-dimensional image of an electron density of the earth's ionosphere from the pulse response.

18. The ionospheric sounder of claim 17, wherein the starting frequency is about 3 MHz, the ending frequency is about 20 MHz.

19. The ionospheric sounder of claim 17, wherein a range of the ionospheric sounder is about 200 km.

20. The ionospheric sounder of claim 17, wherein the transmission frequency varies from the starting frequency to the ending frequency, and is incremented by the step size every pulse repetition interval (PRI).

* * * * *